(12) United States Patent
Dobberphul et al.

(10) Patent No.: US 11,104,378 B2
(45) Date of Patent: Aug. 31, 2021

(54) STEERING CONTROL SYSTEM FOR A STEERING SYSTEM OF A TRANSPORTATION VEHICLE AND METHOD FOR OPERATING A STEERING CONTROL SYSTEM

(71) Applicant: VOLKSWAGEN AKTIENGESELLSCHAFT, Wolfsburg (DE)

(72) Inventors: Timo Dobberphul, Braunschweig (DE); Reno Davids, Braunschweig (DE)

(73) Assignee: Volkswagen Aktiengesellschaft

( * ) Notice: Subject to any disclaimer, the term of this patent is extended or adjusted under 35 U.S.C. 154(b) by 255 days.

(21) Appl. No.: 16/152,890

(22) Filed: Oct. 5, 2018

(65) Prior Publication Data
US 2019/0111966 A1  Apr. 18, 2019

(30) Foreign Application Priority Data

Oct. 12, 2017  (DE) ..................... 10 2017 218 274.1

(51) Int. Cl.
*B62D 5/04*  (2006.01)
*B62D 6/00*  (2006.01)
(Continued)

(52) U.S. Cl.
CPC ........... *B62D 5/0493* (2013.01); *B62D 5/006* (2013.01); *B62D 5/0484* (2013.01); *B62D 6/007* (2013.01); *B62D 15/025* (2013.01)

(58) Field of Classification Search
CPC ...... B62D 5/0493; B62D 6/007; B62D 5/006; B62D 5/0484; B62D 15/025; B62D 6/00; B60W 10/20
(Continued)

(56) References Cited

U.S. PATENT DOCUMENTS

| 2002/0093298 | A1 | 7/2002 | Walter |
| 2007/0112483 | A1 | 5/2007 | Jeong |
| 2014/0107893 | A1* | 4/2014 | Nishimura ............... B62D 6/10 |
| | | | 701/41 |

(Continued)

FOREIGN PATENT DOCUMENTS

| DE | 19633952 A1 | 2/1997 |
| DE | 19716197 A1 | 10/1998 |

(Continued)

OTHER PUBLICATIONS

English Translation: Uda, Japanese Patent Publication JP 2016001953 A, Jan. 2016, Japanese Patent Office Publication (Year: 2016).*

(Continued)

*Primary Examiner* — Nadeem Odeh
(74) *Attorney, Agent, or Firm* — Barnes & Thornburg LLP

(57) ABSTRACT

A steering control system for operating a steering system for a transportation vehicle according to a steering intervention specification by making available a steering intervention variable, the system having computing units to redundantly calculate a manipulated variable according to a specified calculation algorithm as a function of the steering intervention specification and one or more operating state variables; a switching device for always making available one of the manipulated variables of the computing units as the steering intervention variable to the steering system; and a monitoring device to check the functional capability of the computing units, wherein the switching device is actuated as a function of the result of the check.

6 Claims, 3 Drawing Sheets

(51) Int. Cl.
*B62D 5/00* (2006.01)
*B62D 15/02* (2006.01)

(58) Field of Classification Search
USPC .......................................................... 701/41
See application file for complete search history.

(56) References Cited

U.S. PATENT DOCUMENTS

| 2014/0351658 | A1* | 11/2014 | D'Ambrosio | G06F 11/3055 714/47.2 |
| 2017/0139411 | A1  | 5/2017  | Hartung et al. | |
| 2019/0300009 | A1* | 10/2019 | Sakamoto | B60W 50/035 |
| 2020/0125441 | A1* | 4/2020  | Omori | G07C 5/0808 |

FOREIGN PATENT DOCUMENTS

| DE | 10328707 A1 | 2/2005 |
| DE | 102009000165 A1 | 7/2010 |
| DE | 102012102924 A1 | 10/2013 |
| DE | 102014013756 B3 | 2/2016 |
| DE | 102016112332 A1 | 1/2018 |
| EP | 3173314 A1 | 5/2017 |
| JP | 2016001953 A | 1/2016 |
| KR | 20080086995 A | 9/2008 |
| WO | 2011032586 A1 | 3/2011 |
| WO | 2014131645 A1 | 9/2014 |

OTHER PUBLICATIONS

Joan, Difference Between FPGA and Microprocessor, May 28, 2012, DifferenceBetween.net Online Website <http://www.differencebetween.net/technology/hardware-technology/difference-between-fpga-and-microprocessor/> (Year: 2012).*
Search Report for German Patent Application No. 10 2017 218 274.1; dated Jul. 2, 2018.

* cited by examiner

STEERING CONTROL SYSTEM FOR A STEERING SYSTEM OF A TRANSPORTATION VEHICLE AND METHOD FOR OPERATING A STEERING CONTROL SYSTEM

PRIORITY CLAIM

This patent application claims priority to German Patent Application No. 10 2017 218 274.1, filed 12 Oct. 2017, the disclosure of which is incorporated herein by reference in its entirety.

SUMMARY

Illustrative embodiments relate to steering control systems for steering systems in transportation vehicles, in particular, steering control systems for controlling steering interventions during use in an autonomous driving mode.

BRIEF DESCRIPTION OF THE DRAWINGS

Disclosed embodiments are explained in more detail below on the basis of the appended drawings, in which.

DETAILED DESCRIPTION

Figure 1:
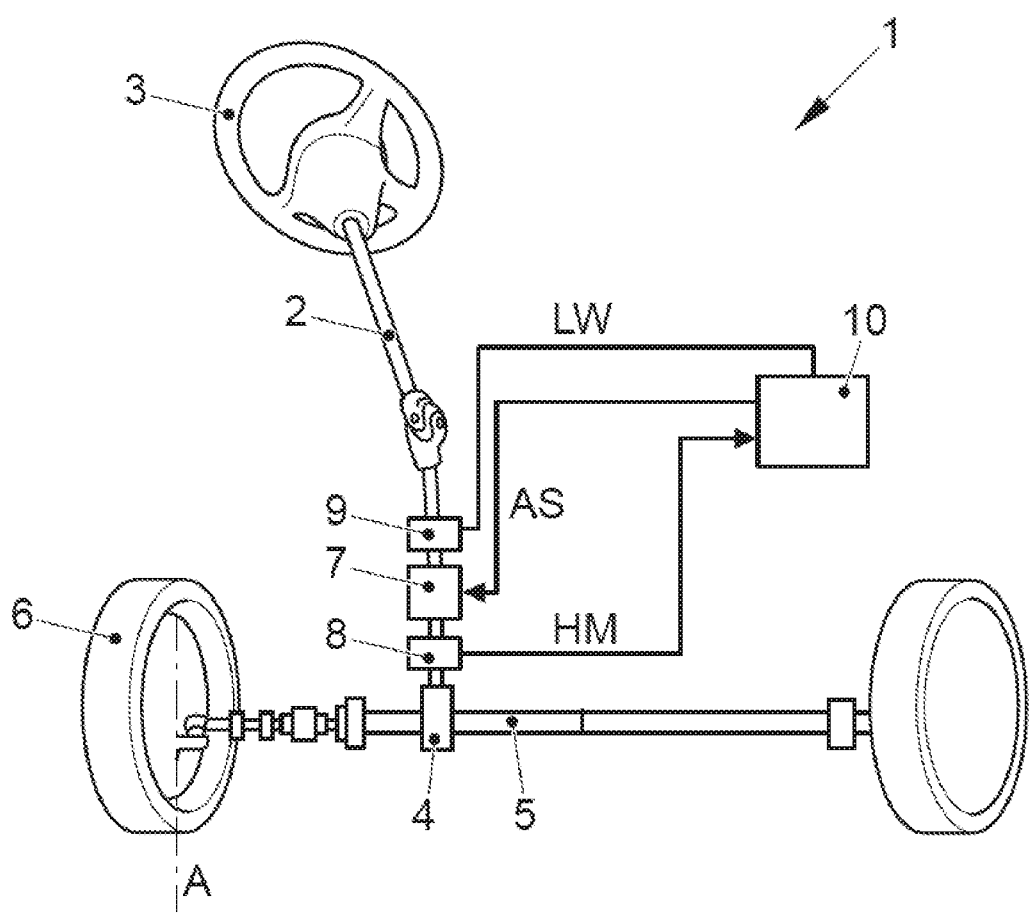
FIG. 1 shows a steering system for a transportation vehicle having a steering control system.

Transportation vehicles can be equipped with an autonomous driving function which permits independent driving of the transportation vehicle without a driver having to carry out steering interventions by a steering wheel activation or propulsion-relevant interventions such as, e.g., activating an accelerator pedal or a brake pedal. A significant part of the autonomous driving function is here the specification of steering intervention variables to a steering control system so that the steering control system implements a steering intervention in a satisfactory state in accordance with the specified steering intervention variable.

When a fault occurs in the autonomous driving mode or when deactivation of the autonomous driving mode is requested, either sufficient time must be provided for assumption of control by a driver or the transportation vehicle must be capable of coming to a standstill automatically at the side of the road. Steering control systems which are configured for the autonomous driving mode therefore have to be configured in a fail-safe state to a high degree.

It is insufficient to implement the steering control unit with redundant computing units, since when a malfunction occurs the active mechanism of the faulty computing unit has to be disconnected to avoid triggering a faulty steering intervention. For this reason, measures are necessary to decouple the active mechanism of the faulty computing unit, such as, e.g., by disconnecting the power supply. However, this measure must not decouple a computing unit which is only suspected of being faulty, since otherwise a correctly functioning computing unit could be incorrectly decoupled.

Document DE 103 28 707 A1 discloses a fail-silent databus in a brake system of a transportation vehicle having data communication running in each case between two or more bus nodes, on two parallel data lines, and having a bus driver for each data line. A control device controls the bus access. Redundancy in the sensor function or computing function is achieved by virtue of the fact that the entire control unit is duplicated.

Document DE 10 2014 013 756 B3 discloses electrical equipment of a transportation vehicle having an at least partially electrical braking and steering device. A fault tolerance in the event of a failure of a steering system component is improved by virtue of the fact that it is attempted to at least partially replace the failed steering effect of the respective steering system component by generating a yawing moment by selective braking of individual wheels. To increase the fail-safety further, the power supply of the combined braking and steering device is embodied in a redundant state as a further transportation vehicle battery.

Document WO 2014/131645 discloses a brake system with which the safety requirements of the autonomous driving are satisfied. When a fault occurs, braking is to be possible even without activation of the brake pedal by the driver. For this purpose, a first and a second open-loop and closed-loop control unit are provided for controlling autonomous driving functions. The distribution of tasks between the first and second electronic open-loop and closed-loop control units can be controlled by a third open-loop and closed-loop control unit.

Disclosed embodiments make available a steering control system in which an individual fault in one of the computing units does not give rise to faulty implementation of the steering intervention by an autonomous steering function. The steering control system is to be implemented with as little expenditure as possible.

Disclosed embodiments provide the steering control system for a steering system of a transportation vehicle and via the steering system, the transportation vehicle and the method for operating a steering system.

Further refinements are specified in the dependent claims.

According to a first disclosed embodiment, a steering control system is provided for operating a steering system for a transportation vehicle according to a steering intervention specification by making available a steering intervention variable, comprising:

a plurality of computing units which are each designed to calculate a manipulated variable according to a specified calculation algorithm as a function of the steering intervention specification and one or more operating state variables; and a switching device for always making available one of the manipulated variables of the computing units as the steering intervention variable to the steering system; and a monitoring device which is designed to check the functional capability of the plurality of computing units, wherein the switching device is actuated as a function of the result of the check.

Furthermore, the monitoring device can be designed to make available, as a steering intervention variable, the manipulated variable to that computing unit or to one of the computing units for which the checking of the functional capability has not revealed a fault.

One concept of the above steering control system is to process a steering intervention specification of an autonomous driving function in parallel in redundant computing units. These computing units make available corresponding manipulated variables for a steering drive of the steering system to implement a steering intervention which is specified by an autonomous driving function. Furthermore, a monitoring device is provided which is designed to actuate a switching device to always make available one of the manipulated variables of the computing units as the relevant steering intervention variable to the steering system, to implement the predefined steering intervention for the autonomous driving function.

The monitoring device checks the satisfactory functioning of the plurality of computing units and always selects one of the computing units or that computing unit for which no malfunction has been detected, for making available the corresponding manipulated variable as a steering intervention variable to the steering system. It is essential that the monitoring device can switch over only between the plurality of computing units, so that one of the manipulated variables of the computing units is always made available to the steering system, it is possible to prevent interruption of the active mechanism, i.e., prevent the making available of all the manipulated variables to the steering system from being disabled.

The monitoring device monitors the computing units for obvious calculation errors to detect corresponding faults in the computing units. Since the monitoring device only has to detect calculation errors in the computing units, the monitoring functions which are implemented therein can be constructed with significantly lower complexity so that it is sufficient for only two functionally capable computing units to carry out the autonomous driving function redundantly.

With this architecture it is possible to prevent a simple (individual) malfunction in one of the components (computing units, monitoring device, switching device) of the steering control system from not adversely affecting the satisfactory implementation of the steering intervention specification in a steering intervention variable in the steering system. If, for example, a fault occurs in one of the computing units, the monitoring device detects this and switches the switching device in such a way that the manipulated variable of one of the other computing units or of the other computing unit is made available as a steering intervention variable for actuating the steering system.

If a fault occurs in the monitoring device, this may only lead to a situation in which the switching device remains at or switches to the set switched position to make available the manipulated variable of a (functionally capable) other computing unit of the computing units to the steering system. Even if the switching device is defective and no longer reacts to the actuation of the monitoring device, the manipulated variable of a satisfactorily functioning computing unit is nevertheless passed on as a steering intervention variable to the steering system, since the switching device can only switch between the outputs of the computing units and cannot perform switching off. Overall, the above steering control system makes it possible to ensure that an individual fault does not bring about a failure of the implementation of the steering intervention specification, e.g., of an autonomous driving function.

There can be provision that the calculation algorithms of the computing units are developed in a diverse state, so that the calculation algorithms are implemented in different software codes, but, in particular, carry out the same calculation functions.

According to at least one disclosed embodiment, the monitoring device can be designed to check the functional capability of the plurality of computing units in that the plausibility of the manipulated variables which are calculated by the computing units is checked.

The monitoring device can be designed to check the functional capability of the plurality of computing units by checking whether the manipulated variable exceeds a predefined maximum value or lies outside a permissible range, wherein the maximum value and the permissible range are fixedly specified or are determined as a function of the one or more operating state variables and/or the steering intervention specification.

Furthermore, the monitoring device can have a lower hardware complexity than the computing units.

According to a further disclosed embodiment, a steering system is provided having the above steering control system for making available a steering intervention variable and having a steering drive for bringing about a steering intervention force or a steering intervention torque as a function of the steering intervention variable.

According to a further disclosed embodiment, a method for operating a steering control system for a steering system is provided, wherein the steering control system comprises a plurality of computing units which are each designed to calculate a manipulated variable according to a specified calculation algorithm as a function of the steering intervention specification and one or more operating state variables, wherein precisely one of the manipulated variables is always made available as a steering intervention variable to a steering drive of the steering system; having the following operations:
  checking the functional capability of the plurality of computing units;
  making available one of the manipulated variables of the computing units as the steering intervention variable to the steering system as a function of the result of the check.

FIG. 1 shows a schematic illustration of a steering system 1 of a transportation vehicle. The steering system 1 comprises a steering column 2 which is coupled to a steering wheel 3, so that a steering movement which is applied to the steering wheel 3 by a driver acts as a manual torque on the steering column 2. The steering column 2 transmits the manual torque to a pinion 4 which is coupled to a steering rack 5.

The steering rack 5 is arranged between two steered wheels 6 of the transportation vehicle. The wheels 6 are secured in such a way that when there is a linear movement of the steering rack 5 they are pivoted about a pivoting axis.

The steering column 2 or the steering rack 5 is also coupled to a steering drive 7 to make available a steering intervention. The steering intervention can correspond to a steering intervention torque which acts on the steering column 2, or to a steering intervention force on the steering rack 5. In the exemplary embodiment shown in FIG. 1, the steering drive 7 acts on the steering rack 5.

A steering control system 10 is also provided which is designed to control the steering system 1 and to implement a steering intervention specification LV. A manual torque which is applied to the steering column 2 via the steering wheel 3 can be determined by a torque sensor 8 on the steering column 2, and a corresponding manual torque indication HM can be transferred to the steering control system 10. Correspondingly, the steering column 2 can be provided with a steering angle sensor 9 which detects a rotational angle of the steering column 2 and makes available a corresponding steering angle indication LW to the steering control system 10. Instead of or in addition to the steering angle sensor 9 it is possible to provide a position angle sensor which determines a precise rotor position of a steering assistance motor of the steering drive 7.

The steering control system 10 implements a multiplicity of steering functions which engage in the steering system 1 and the steering process by actuation of the steering drive 7. Such steering functions can comprise, inter alia, roadway feedback optimization, steering pull compensation, locking detection, adaptation of the steering sensation during oversteering/understeering, a steering-rack-force-dependent steering assistance, assistance force control and optimized active resetting. Furthermore, the steering control system 10 can be designed to receive the steering intervention specification LV, e.g., from an autonomous driving function and convert it, in accordance with a calculation algorithm, into a steering intervention variable AS for actuating the steering drive 7 of the steering system 1.

Figure 2:
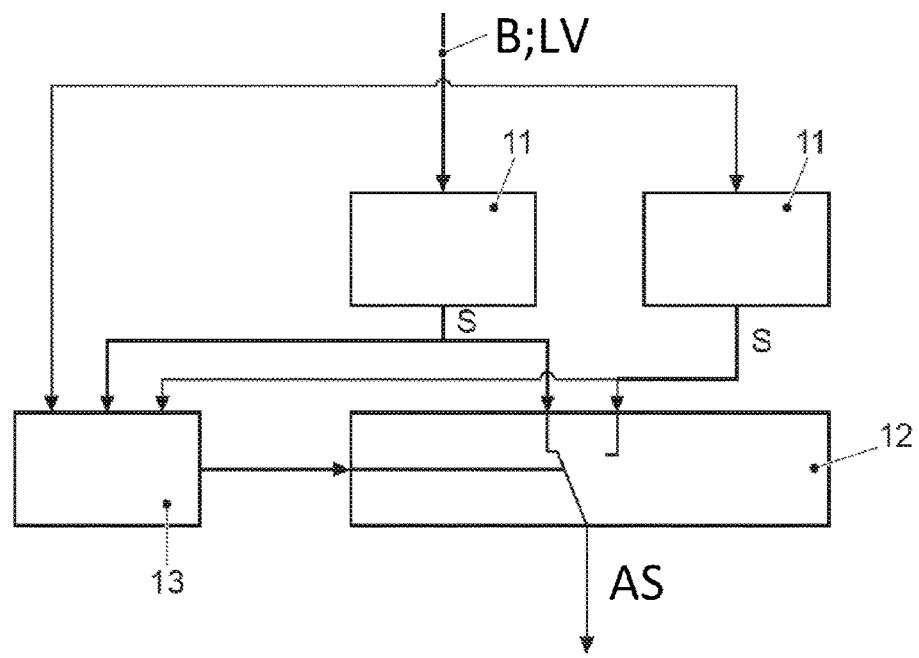
FIG. 2 shows a more detailed illustration of the design of the steering control system for use in a steering system.

The steering control system 10 has a configuration such as is illustrated schematically in FIG. 2. The steering control system 10 in FIG. 2 has, for example, two identical or comparable computing units 11. It is also possible to provide more than two computing units 11. Operating state variables B and a steering intervention specification LV are fed to the computing units 11 to determine a manipulated variable which is suitable for being used as steering intervention variable AS for actuating the steering drive 7. The steering intervention specification LV can correspond to a specification of an autonomous steering function and correspond, in particular, to a steering angle or to a steering torque.

The operating state variables B for the calculation of the manipulated variable S can comprise an indication of the quality of the roadway, a steering rack force, an ambient temperature, a transportation vehicle speed and the like.

The computing units 11 determine from the operating state variables B and the steering intervention specification LV, essentially through parallel calculation, in each case a corresponding manipulated variable S which is respectively suitable for actuating the steering system 1 as steering intervention variable AS. The steering intervention variable AS for the steering system 1 generally corresponds to an actuating torque for the steering drive 7, which is implemented there in a suitable way. The steering functions which are implemented in the computing units 11 can be developed/programmed in an identical or diverse state, to largely rule out systematic faults which are due to the same causes. That is to say the same calculation functions are carried out by different software codes.

The manipulated variables S which are made available by the computing units 11 are applied to corresponding inputs of a switching device 12. The switching device 12 also has a control input which will be actuated by a monitoring device 13. The switching device 12 is embodied in such a way that one of the manipulated variables S which are made available by the computing units 11 is inevitably output to an output of the switching device 12 as the steering intervention variable AS which is to be used (for actuating the steering drive 7) for the steering system 1.

The monitoring device 13 is designed to monitor the calculation in the computing units 11, and, when an obvious fault occurs, to actuate the switching device 12 in such a way that the manipulated variable S of that computing unit 11 or of one of the computing units 11 in which an incorrect calculation has not been detected, is made available as a steering intervention variable AS to the steering system 1 by the switching device 12.

The calculation functions implemented in the computing units 11 can comprise closed-loop control functions, adaptation functions and the like and can be parameterized on a transportation vehicle-specific basis or in accordance with the transportation vehicle type. In contrast, the monitoring functions which are implemented in the monitoring device 13 serve only to monitor the plausibility of the manipulated variable S which is made available by the individual computing units 11. The monitoring can be carried out on the basis of one or more of the operating state variables B which are made available to the computing units 11, and the steering intervention specification LV, so that a fault is detected if the calculation result as the respective manipulated variable S is not plausible with respect to the supplied operating state variables B and the steering intervention specification LV. By the fault detection only on the basis of plausibility checking of the monitoring function, the monitoring device 13 can be constructed with significantly less complexity in comparison with the computing units 11, so that, over and above the redundancy of the computing units 11, there is only a low level of additional implementation expenditure.

For example, such a monitoring function can comprise checking the manipulated variables S of the computing units 11 for the exceeding of a predefined maximum value. The maximum value can be specified as a function of the operating state variables B and the steering intervention specification LV or independently thereof. A fault is detected for that computing unit 11 whose manipulated variable S exceeds the predefined maximum value. Furthermore, the manipulated variables S can also be monitored with respect to a permissible range, which results from the operating state variables B and the steering intervention specification LV. A fault is detected for that computing unit 11 whose manipulated variable S is outside the permissible range.

The above steering control system 10 has, on the basis of redundant provision of the computing units 11, only a small excess of expenditure on hardware to permit a tolerance with respect to individual faults. This ensures a high level of fail safety of the entire steering control system 10. Basically, the number of computing units 11 used is random, but the steering control system 10 with two computing units 11 already provides sufficient security with respect to individual faults with the lowest possible expenditure on hardware.

Figure 3:
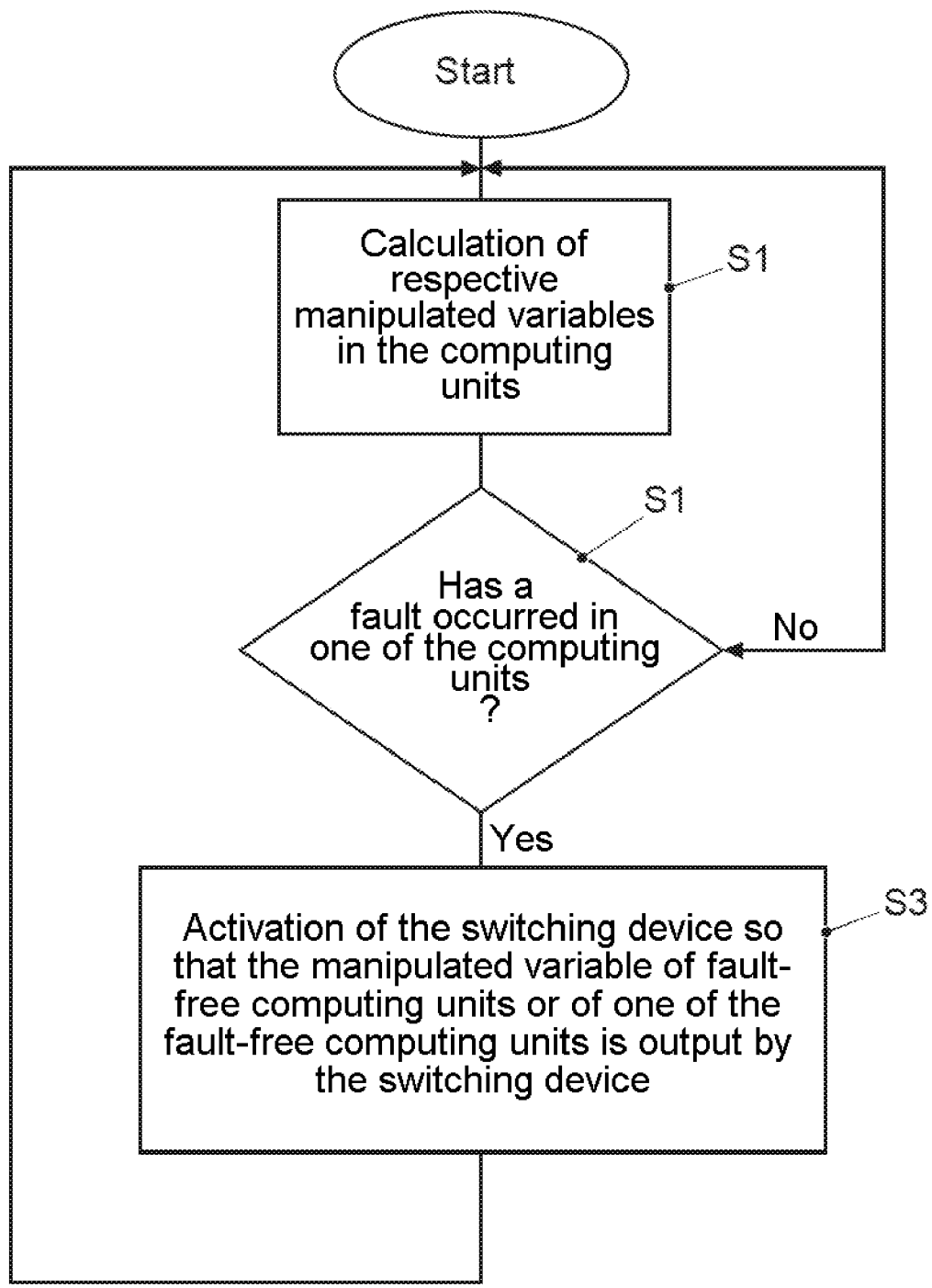
FIG. 3 shows a flowchart illustrating a method for operating the steering control system by the monitoring device.

FIG. 3 illustrates in more detail a flowchart showing the function of the monitoring device 13. In operation at S1, the computing units 11 calculate the manipulated variables S essentially in parallel from the specified operating state variables B and the steering intervention specification LV.

In operation at S2 it is checked whether the manipulated variables S which are made available by all the computing units 11 correspond to the monitoring conditions for the monitoring function. If it is detected for one of the computing units 11 that the manipulated variable S which is made available does not correspond to the monitoring conditions (alternative: Yes), the switching device 12 is actuated in such a way that the manipulated variable S of the computing unit 11 which functions satisfactorily or the manipulated variable S of one of the other computing units 11 which function satisfactorily can output to the output of the switching device 12 as a steering intervention variable AS. Otherwise (alternative: No), the switched state of the switching device 12 is not changed and the system jumps back to operation at S1.

With the above configuration of the steering control system 10 it is possible to prevent a simple (single) malfunction in one of the components of the steering control system 10 from not adversely affecting the satisfactory implementation of the steering intervention specification LV in the steering system 1. If, for example, a fault occurs in one of the computing units 11, the monitoring device 13 detects this and switches the switching device 12 in such a way that the manipulated variable S of one of the other computing units 11 or of the other computing unit 11 is made available as a steering intervention variable AS for actuating the steering system 1. If a fault occurs in the monitoring device 13, this can only lead to a situation in which the switching device 12 remains at or switches to the set switched position to make available the manipulated variable S of a (functionally capable) other computing unit of the computing units 11 to the steering system 1. Even if the switching device 12 is defective and no longer reacts to the actuation of the monitoring device 13, the manipulated variable S of a satisfactorily functioning computing unit 11 is nevertheless passed on as a steering intervention variable AS to the steering system 1, since the switching device 12 can only switch between the outputs of the computing units 11 and cannot perform switching off. Overall, the above steering control system 10 ensures that an individual fault does not bring about a failure of the implementation of the steering intervention specification LV, e.g., of an autonomous driving function.

LIST OF REFERENCE SYMBOLS

1 steering system
2 steering column
3 steering wheel
4 pinion
5 steering rack
6 steered wheels
7 steering drive
8 torque sensor
9 steering angle sensor
10 steering control system
11 computing unit
12 switching device
13 monitoring device
B operating state variable
AS steering intervention variable
LV steering intervention specification
HM manual torque indication

The invention claimed is:

1. A steering control system for operating a transportation vehicle steering system to control steering intervention during an autonomous driving mode of a transportation vehicle using a steering intervention specification and a steering intervention variable based on one or more operating state variables of the transportation vehicle, the steering control system comprising:
   a plurality of manipulated variable computing units that redundantly calculate a manipulated variable using a specified calculation algorithm as a function of the steering intervention specification and the one or more operating state variables of the transportation vehicle;
   a monitoring device configured to check functional capability of the plurality of manipulated variable computing units by calculating plausibility of the redundantly calculated manipulated variable of each of the plurality of manipulated variable computing units, and determining whether a respective manipulated variable exceeds a predefined maximum value or lies outside a permissible range, wherein the predefined maximum value or the permissible range is defined as a function of the one or more transportation vehicle operating state variables and the steering intervention specification; and
   a switching device for always selecting one of the redundantly calculated manipulated variables as the steering intervention variable to be made available to the transportation vehicle steering system, wherein the monitoring device outputs a result of the functional capability check to the switching device,
   wherein the switching device is actuated as a function of the result of the functional capability check such that the selected manipulated variable of the redundantly calculated manipulated variables corresponds to one of the plurality of manipulated variable computing units for which no malfunction has been detected by the monitoring device,
   wherein the plurality of manipulated variable computing units utilize the one or more operating state variables and the steering intervention specification to determine the steering intervention variable for actuating a steering drive of the transportation vehicle steering system, and
   wherein the steering intervention specification corresponds to an autonomous steering function specification relating to steering angle or steering torque.

2. The steering control system of claim 1, wherein the specified calculation algorithm of the plurality of manipulated variable computing units is developed in a diverse state so the specified calculation algorithm is implemented in different software codes.

3. A transportation vehicle steering system of a transportation vehicle having a steering control system for controlling steering intervention during an autonomous driving mode based on a steering intervention variable and having a steering drive for bringing about a steering intervention force or a steering intervention torque as a function of the steering intervention variable, wherein the steering control system operates the steering drive using a steering intervention specification and the steering intervention variable, the steering control system comprising:
   a plurality of manipulated variable computing units that redundantly calculate a manipulated variable according to a specified calculation algorithm as a function of the steering intervention specification and one or more operating state variables of the transportation vehicle;
   a monitoring device configured to check functional capability of the plurality of manipulated variable computing units by calculating plausibility of the redundantly calculated manipulated variable of each of the plurality of manipulated variable computing units, and determining whether a respective manipulated variable exceeds a predefined maximum value or lies outside a permissible range, wherein the predefined maximum value or the permissible range is defined as a function of the one or more transportation vehicle operating state variables and the steering intervention specification; and
   a switching device for always selecting one of the redundantly calculated manipulated variables as the steering intervention variable to be made available to the transportation vehicle steering system, wherein the monitoring device outputs a result of the functional capability check to the switching device,
   wherein the switching device is actuated as a function of the result of the functional capability check such that the selected manipulated variable of the redundantly calculated manipulated variables corresponds to one of the plurality of manipulated variable computing units for which no malfunction has been detected by the monitoring device,
   wherein the plurality of manipulated variable computing units utilize the one or more operating state variables and the steering intervention specification to determine the steering intervention variable for actuating the steering drive, and wherein the steering intervention specification corresponds to an autonomous steering function specification relating to steering angle or steering torque.

4. The transportation vehicle steering system of claim 3, wherein the specified calculation algorithm of the plurality of manipulated computing units is developed in a diverse state so the specified calculation algorithm is implemented in different software codes.

5. A method for operating a steering control system for a transportation vehicle steering, system to control steering intervention during an autonomous driving mode of a transportation vehicle, wherein the steering control system includes a plurality of manipulated variable computing units that redundantly calculate a manipulated variable using a specified calculation algorithm as a function of a steering intervention specification and one or more operating state variables of the transportation vehicle, the method comprising:

checking, by a monitoring device, the functional capability of the plurality of manipulated variable computing units by calculating plausibility of the redundantly calculated manipulated variable of each of the plurality of manipulated variable computing units, and determining whether a respective manipulated variable exceeds a predefined maximum value or lies outside a permissible range, Wherein the predefined maximum value or the permissible range is defined as a function of the one or more transportation vehicle operating state variables and the steering intervention specification;

outputting, by the monitoring device, a result of the functional capability check to a switching device; and always selecting, by the switching device, one of the redundantly calculated manipulated variables as a steering intervention variable to be made available to the transportation vehicle steering system, wherein the switching device is actuated as a function of the result of the functional capability check by the monitoring, device such that the selected manipulated variable of the redundantly calculated manipulated variables corresponds to one of the plurality of manipulated variable computing units for which no malfunction has been detected by the monitoring device, wherein the plurality of manipulated variable computing units utilize the one or more operating, state variables and the steering intervention specification to determine the steering intervention variable for actuating a steering drive of the transportation vehicle steering system, and wherein the steering intervention specification corresponds to a specification of an autonomous steering function, in particular, to a steering angle or to a steering torque.

6. The method of claim 5, wherein the specified calculation algorithms of the plurality of manipulated variable computing units are developed in a diverse state so the specified calculation algorithms are implemented in different software codes.

* * * * *